US007614325B2

(12) United States Patent
Huang

(10) Patent No.: US 7,614,325 B2
(45) Date of Patent: Nov. 10, 2009

(54) TOOL PROTECTION APPARATUS

(76) Inventor: Alan Huang, No. 372, Pengyi Rd., Taiping City, Taichung County 411 (TW)

( * ) Notice: Subject to any disclaimer, the term of this patent is extended or adjusted under 35 U.S.C. 154(b) by 98 days.

(21) Appl. No.: 11/980,810

(22) Filed: Oct. 31, 2007

(65) Prior Publication Data

US 2008/0283430 A1 Nov. 20, 2008

(30) Foreign Application Priority Data

May 18, 2007 (TW) .............................. 96117887 A

(51) Int. Cl.
*B25G 1/00* (2006.01)
*A47J 43/28* (2006.01)
*B65D 85/00* (2006.01)

(52) U.S. Cl. ............................ 81/489; 30/323; 206/349

(58) Field of Classification Search ................. 206/349, 206/372–379; 81/489, 492; 30/58, 323, 30/539, 527, 286, 153; 604/192, 197
See application file for complete search history.

(56) References Cited

U.S. PATENT DOCUMENTS

| | | | | |
|---|---|---|---|---|
| 2,413,926 | A * | 1/1947 | Olesen | 30/153 |
| 4,607,432 | A * | 8/1986 | Montgomery | 30/294 |
| 4,707,920 | A * | 11/1987 | Montgomery | 30/294 |
| 5,116,325 | A * | 5/1992 | Paterson | 604/192 |
| 5,697,157 | A * | 12/1997 | Votolato | 30/2 |
| 6,464,419 | B1 * | 10/2002 | Chan | 401/131 |

* cited by examiner

*Primary Examiner*—J. Gregory Pickett
(74) *Attorney, Agent, or Firm*—Wang Law Firm, Inc.; Li K. Wang

(57) ABSTRACT

A tool protection apparatus includes a handle; a protecting cover pivotally coupled to an end of the handle, and substantially U-shaped and hollow on both lateral sides; two pivotal connection portions, each disposed separately on top and bottom surfaces of an intersection of the handle and the protecting cover, and including a latch hole and a circular hole; two protruding pillars, each disposed separately on top and bottom surfaces of an intersection of the handle and the protecting cover, and passing through each circular hole; two limit position slots, each disposed on the protecting cover and at a position proximate to the pivotal connection portion; two stop portions, each disposed on the handle and at a position proximate to the protruding pillar, and the stop portion can be latched precisely into limit position slot, such that the present invention is a safe and easy-to operate tool protection apparatus.

3 Claims, 5 Drawing Sheets

TOOL PROTECTION APPARATUS

BACKGROUND OF THE INVENTION

1. Field of the Invention

The present invention relates to a tool protection apparatus that comes with a simple and easy operation and a high safety.

2. Description of the Related Art

Referring to FIG. 5 for a general prior art hand tool 3, a tool head of the hand tool 4 has a sharp distal edge to cope with its operating effect. Although the sharp edge of the hand tool 4 can give a good operating effect, yet it is dangerous to carry a sharp tool, particularly when the hand tool 4 drops by accident, it may jeopardize the safety of users, and thus the present invention intends to improve the safety issue of the aforementioned hand tool.

SUMMARY OF THE INVENTION

It is a primary objective of the present invention to provide a tool protection apparatus that comes with a simple operation and a high safety to overcome the shortcomings of the prior art.

To achieve the foregoing objective, the present invention provides a tool protection apparatus, comprising:

a handle;

a protecting cover, pivotally coupled to an end of the handle, and being substantially in a U-shape and hollow on both lateral sides;

two pivotal connection portions, each disposed separately on top and bottom surfaces of an intersection of the handle and the protecting cover, and each of the pivotal connection portions comprising a latch hole and a circular hole;

two protruding pillars, each disposed separately on top and bottom surfaces of an intersection of the handle and the protecting cover, and each of the protruding pillars passing through each circular hole;

two limit position slots, each disposed on the protecting cover and at a position proximate to the pivotal connection portion; and two stop portions, each disposed on the handle and at a position proximate to the protruding pillar, and the stop portion being latched precisely into the limit position slot.

DETAILED DESCRIPTION OF THE PREFERRED EMBODIMENTS

Figure 1:
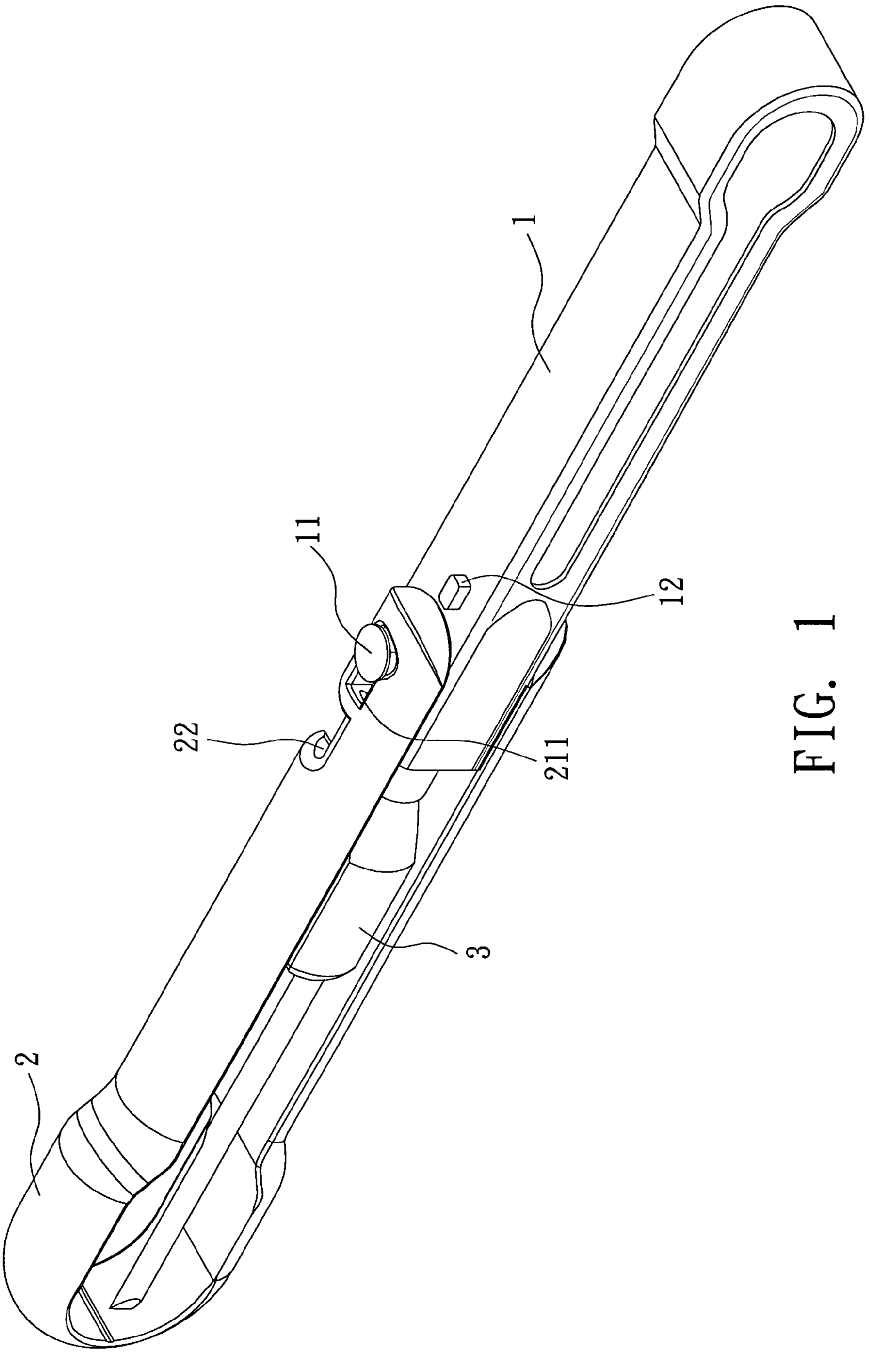
FIG. 1 is a perspective view of the present invention.
Figure 2:
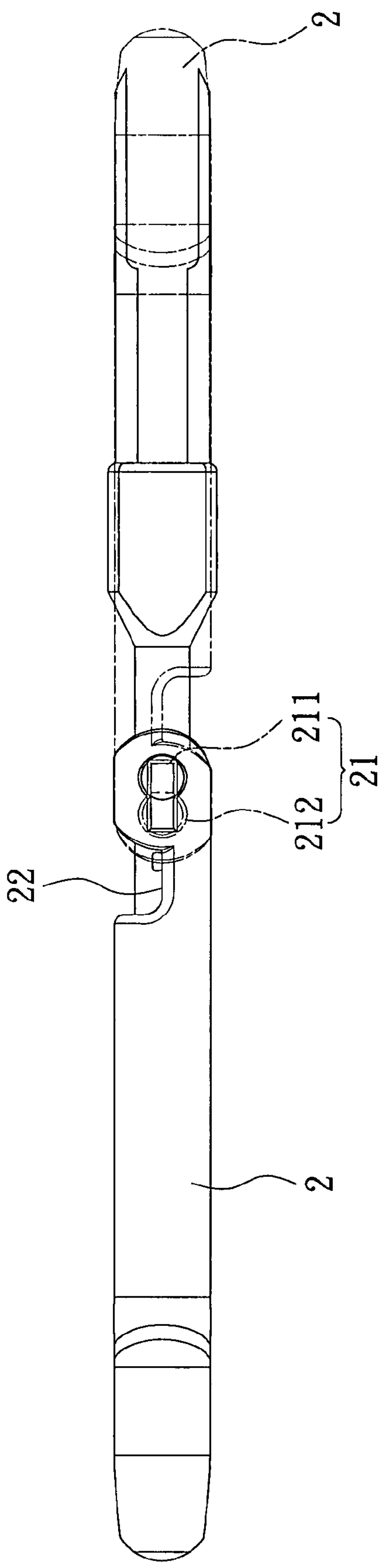
FIG. 2 is a schematic view of operating and using the present invention.
Figure 3:
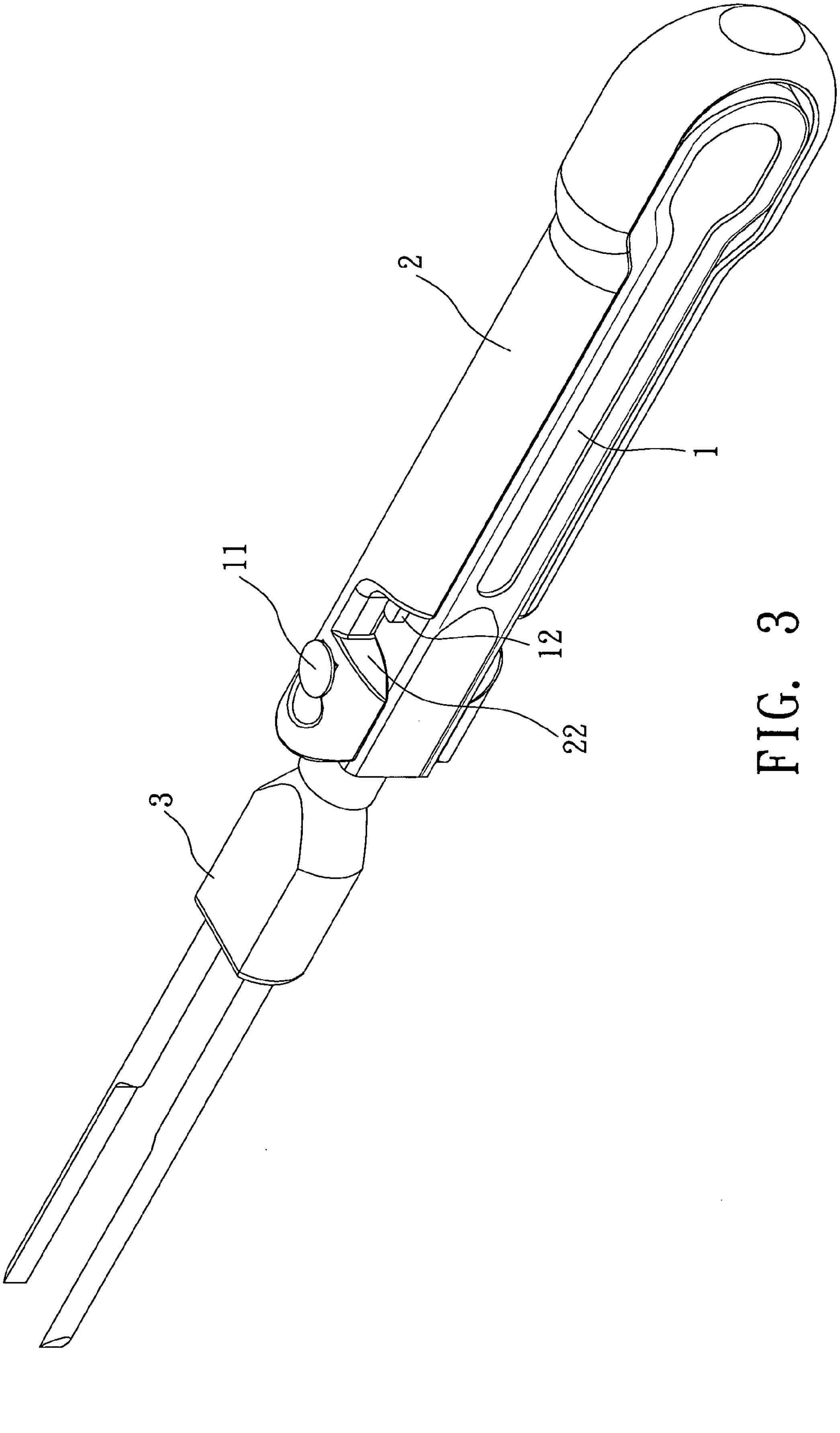
FIG. 3 is a perspective view of operating and using the present invention.

Referring to FIGS. 1 to 3 for a structure of a tool protection apparatus in accordance with a preferred embodiment of the present invention, the embodiment is used for illustrating the invention only, but not intended for limiting the scope of the present invention.

The tool protection apparatus in accordance with a preferred embodiment of the present invention comprises:

a handle 1;

a protecting cover 2, pivotally coupled to an end of the handle 1, and the protecting cover 2 being substantially in a U-shape and hollow on both lateral sides, and in this embodiment, wherein the protecting cover 2 is integrally formed (by injection molding);

two pivotal connection portions 21, each disposed separately on top and bottom surfaces of an intersection of the handle 1 and the protecting cover 2, and each of the pivotal connection portions 21 comprising a latch hole 211 and a circular hole 212;

two protruding pillars 11, each disposed separately on top and bottom surfaces of an intersection of the handle 1 and the protecting cover 2, and each of the protruding pillars 11 passing through each circular hole 212;

two limit position slots 22, each disposed on the protecting cover 2 and at a position proximate to the pivotal connection portion 21; and two stop portions 12, each disposed on the handle 1 and at a position proximate to the protruding pillar 11, and the stop portion 12 being latched precisely into the limit position slot 22.

In FIG. 1, the present invention provides a safer way of carrying a tool by pivotally turning the protecting cover 2 to a position of a tool head 3, so as to cover the sharp distal edge of the tool head 3.

In FIGS. 2 and 3, a user pivotally turns the protecting cover 2 to the handle 1 to expose the tool piece 3 for its use, whenever the user wants to use the tool. The operation procedure includes a step of pushing the protecting cover 2 towards the handle 1, wherein the pivotal connection portion 21 includes a latch hole 211 and a circular hole 212, and thus the external diameter of the latch hole 211 is approximately equal to the external diameter of the protruding pillar 11 to provide a latching effect, and the external diameter of the circular hole 212 is greater than the external diameter of the protruding pillar 11 of the handle 1, such that when the protruding pillar 11 is installed into the circular hole 212, the protecting cover 2 slides away from the latch of the latch hole 211 for a pivotal turn, and the protecting cover 2 is pushed towards the handle 1 by sliding the protruding pillar 11 away from the latch hole 211, and entering into the circular hole 212 to facilitate a pivotal turn. After the protecting cover 2 is turned pivotally to overlap with the handle 1, the stop portion 12 of the handle 1 is limited by the limit position slot 22 of the protecting cover 2, and thus the protecting cover 2 can no longer be turned pivotally. Now, the protecting cover 2 is pushed further towards the tool head 3, so that the protruding pillar 11 enters into the position of the latch hole 211 from the position of the circular hole 212 to achieve the effect of positioning the protecting cover 2. If it is necessary to store the tool after its use, the operation procedure is reversed. The protecting cover 2 is positioned to cover the position of the tool head 3, so as to facilitate users to carry the tool safely.

Figure 4:
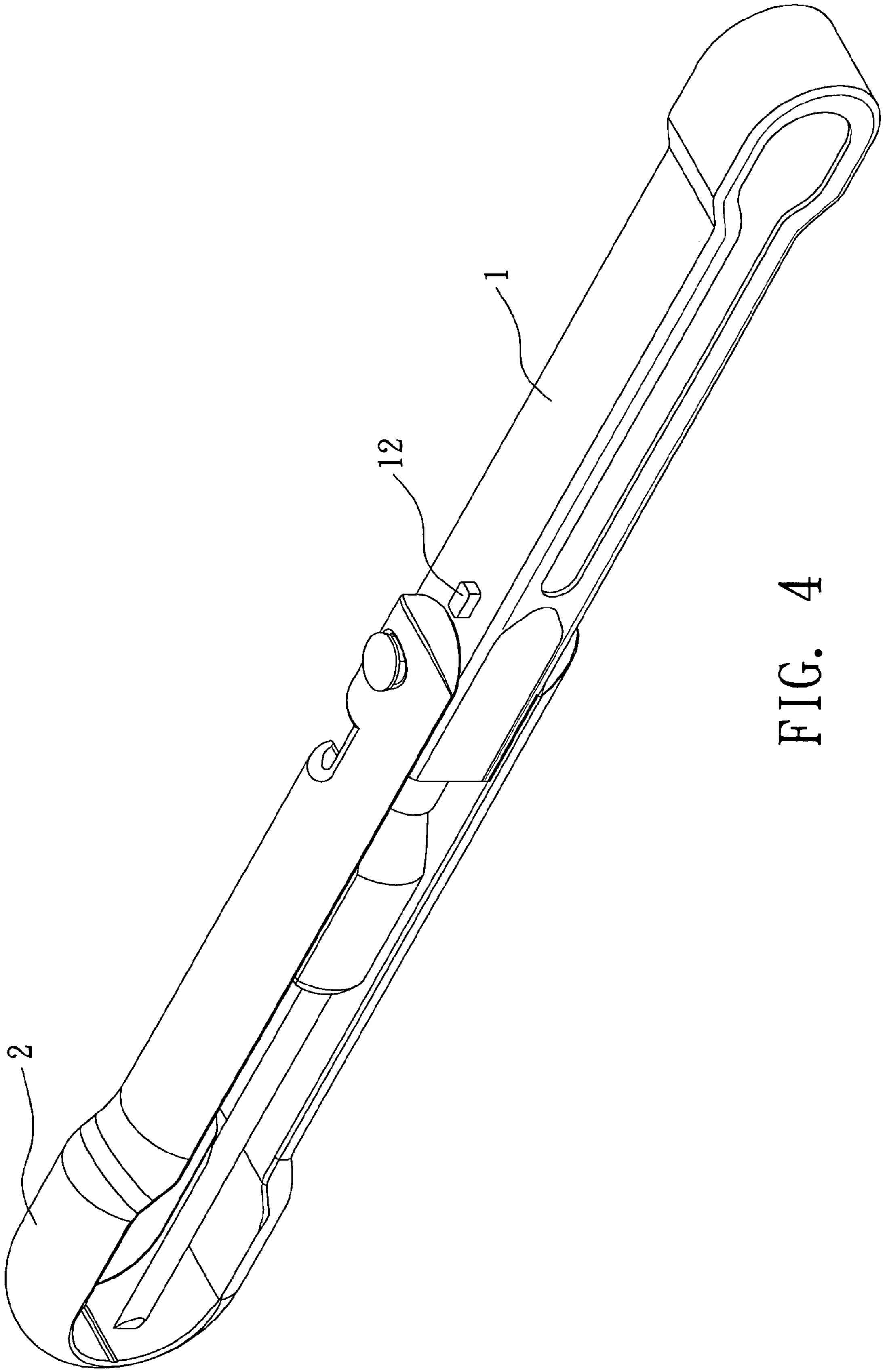
FIG. 4 is a schematic view of a second preferred embodiment of the present invention.
Figure 5:
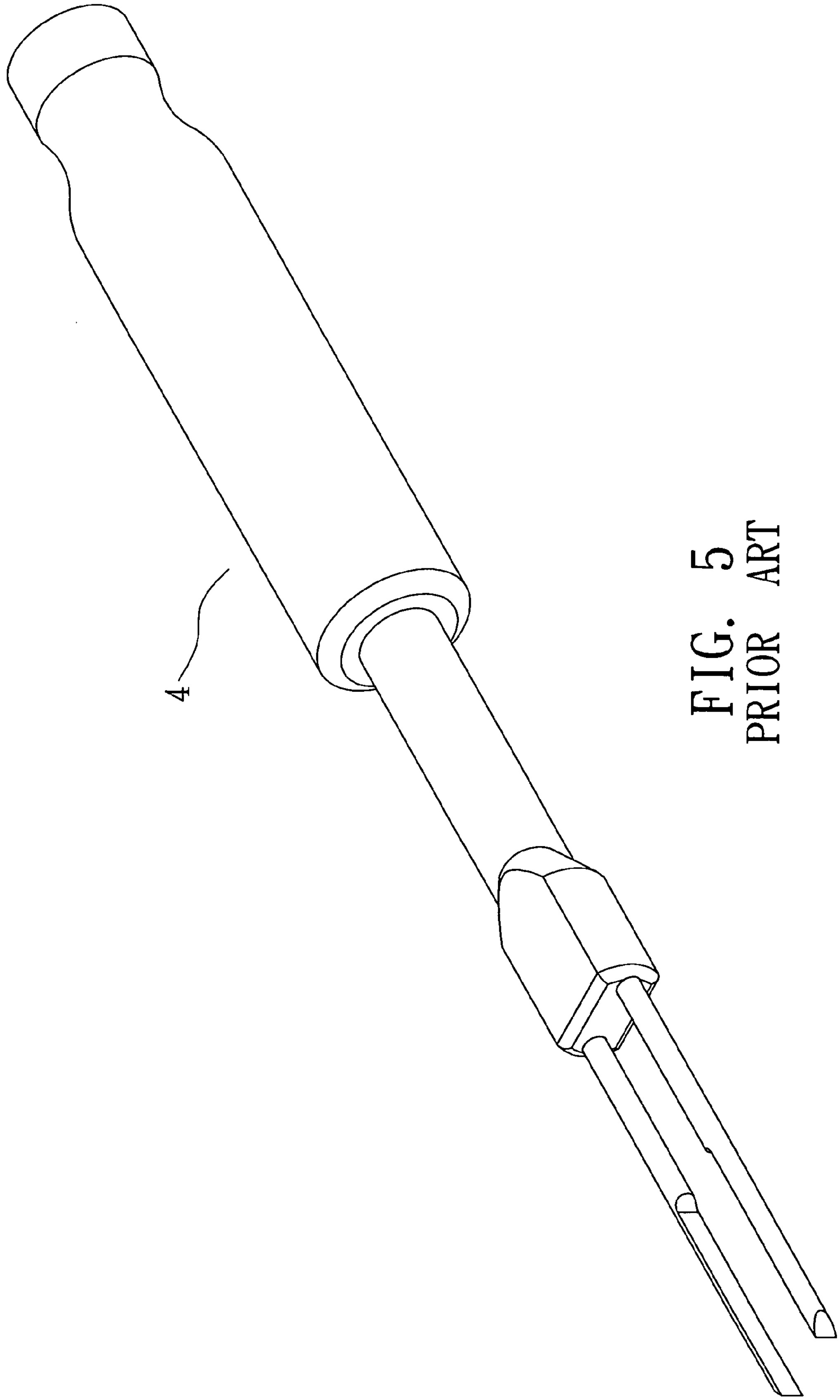
FIG. 5 PRIOR ART
FIG. 5 is a schematic view of a conventional hand tool.

Referring to FIG. 4 for a second preferred embodiment of the present invention, the tool protection apparatus uses a stop portion 12 to press against the protecting cover 2 proximate to an end of the handle 1, so as to provide a safe tool protection apparatus.

In summation of the description above, the present invention is definitely a safe, easy-to-use and convenient tool protection apparatus.

What is claimed is:

1. A tool protection apparatus, comprising:

a handle;

a protecting cover, pivotally coupled to an end of the handle, and the protecting cover being substantially in a U-shape and hollow on both lateral sides;

two pivotal connection portions, each disposed separately on top and bottom surfaces of an intersection of the handle and the protecting cover, and each of the pivotal connection portions comprising a latch hole and a circular hole;

two protruding pillars, each disposed separately on top and bottom surfaces of an intersection of the handle and the protecting cover, and each of the protruding pillars passing through each circular hole;

two limit position slots, each disposed on the protecting cover and at a position proximate to the pivotal connection portion; and two stop portions, each disposed on the handle and at a position proximate to the protruding pillar, and the stop portion is latched precisely into the limit position slot.

2. The tool protection apparatus as recited in claim 1, wherein the handle includes a tool head disposed at an upper end of the handle.

3. The tool protection apparatus as recited in claim 1, wherein the protecting cover is integrally formed.

* * * * *